(No Model.)
F. A. BROWNELL.
TRIPOD.
No. 572,326. Patented Dec. 1, 1896.
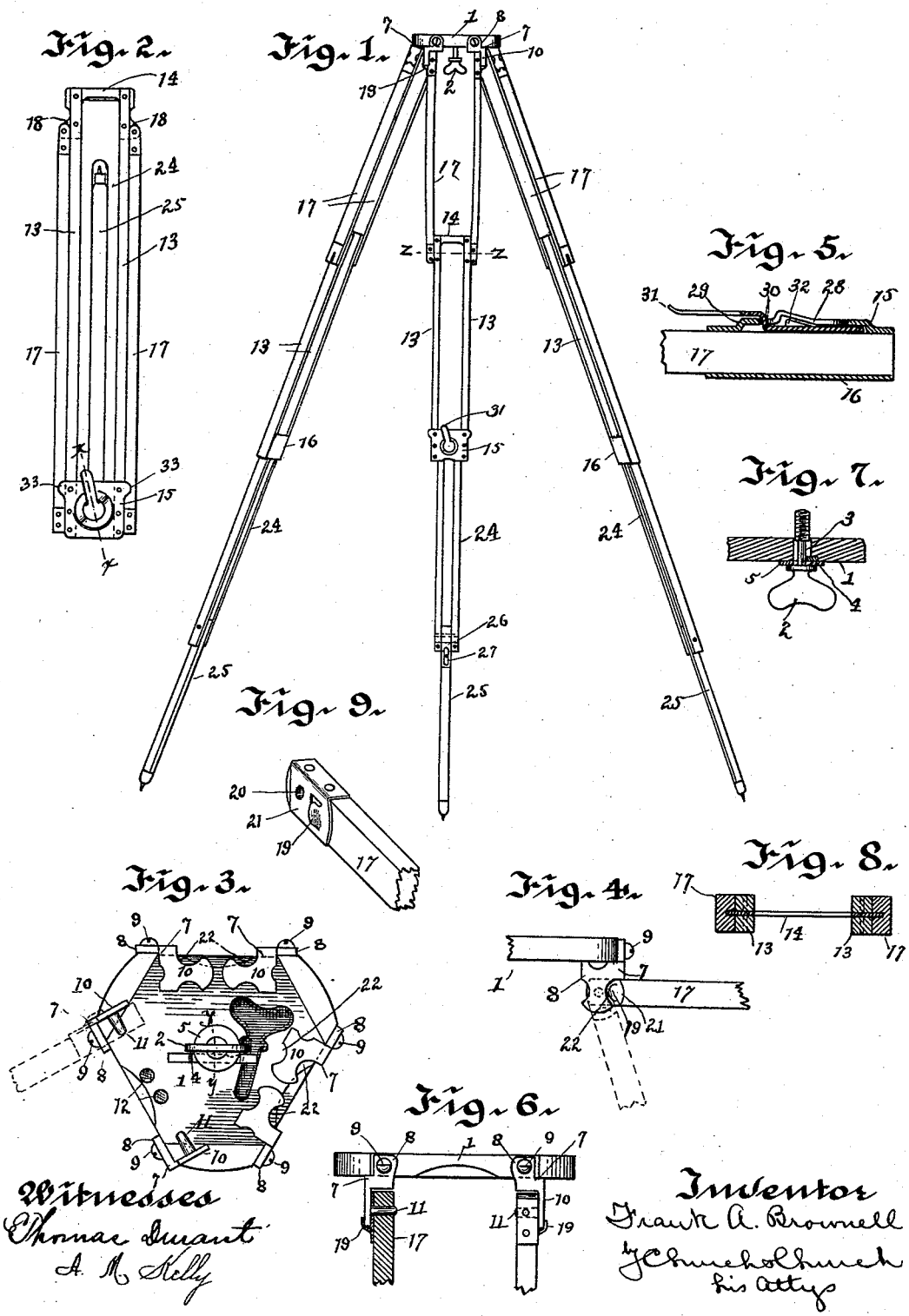

UNITED STATES PATENT OFFICE.

FRANK A. BROWNELL, OF ROCHESTER, NEW YORK, ASSIGNOR TO THE EASTMAN KODAK COMPANY, OF SAME PLACE.

TRIPOD.

SPECIFICATION forming part of Letters Patent No. 572,326, dated December 1, 1896.

Application filed June 1, 1893. Serial No. 476,221. (No model.)

*To all whom it may concern:*

Be it known that I, FRANK A. BROWNELL, of Rochester, in the county of Monroe and State of New York, have invented certain new and useful Improvements in Tripods; and I do hereby declare the following to be a full, clear, and exact description of the same, reference being had to the accompanying drawings, forming a part of this specification, and to the reference-numerals marked thereon.

My present invention has for its object to provide an improved camera stand or tripod for holding photographic cameras or other instruments of like nature whereby the legs and head can be folded and packed for transportation in a very small compass; and it consists in certain improvements in construction and combinations of parts, all as will be hereinafter fully described, and the novel features pointed out in the claims at the end of this specification.

In the drawings, Figure 1 is a side elevation of a tripod constructed in accordance with my invention; Fig. 2, a plan view of one of the legs folded; Fig. 3, a bottom plan view of the head or plate on which the camera is supported; Fig. 4, a side elevation showing the manner of attaching the legs to the head; Fig. 5, a sectional view on the line *x x* of Fig. 2; Fig. 6, an enlarged view, partly in section, showing the attachment of one of the legs and the head; Fig. 7, a sectional view on the line *y y* of Fig. 3; Fig. 8, a sectional view on the line *z z* of Fig. 2; Fig. 9, a view of the end of one of the legs.

Similar reference-numerals in the several figures indicate similar parts.

The tripod-head on which the camera or other instrument is supported consists, preferably, of a board or plate 1, preferably somewhat triangular in form and constructed of wood, or of metal, if desired, provided with a central aperture for the passage of the securing-screw 2, having a reduced portion 3 for the accommodation of a sliding plate or bolt 4, operating beneath a confining-plate 5 on the under side of the head 1, said bolt having a cut-away portion adapted, when in line with the securing-aperture, to permit the withdrawal of the screw for the purpose of transportation, and when withdrawn the screw may be placed in a recess 40, formed in the under side of the head 1, said recess being so situated that the sliding bolt will project across it and hold the screw in position therein, as shown in dotted lines in Fig. 3, this arrangement preventing the accidental loss of the securing-screw when the tripod is packed for transportation.

On each side of the tripod-head 1 are pivoted two brackets 7, having ears 8, through which pass the screws 9, on which they are pivoted, and ears 10, provided on their inner proximate sides with studs or trunnions 11, with which the lugs coöperate. These brackets 7 are so arranged that they may be turned on the securing-screws so that the parts 10 will be parallel with the head 1, the studs or trunnions entering recesses 12, provided in said head, as shown in Fig. 3, or they may be turned up, as shown at the left of said figure, with the studs projecting in line and adapted for the attachment of the legs, the shoulders of the brackets then engaging the head and holding it rigid.

Each of the legs is composed in the present instance of four parts, one of which is composed of strips 13, connected at their upper ends by a plate 14, inserted in slots therein, and at the other end by plates 15 and 16, secured on opposite sides of said strips. The upper section of the leg is composed of two strips 17, preferably of wood, pivoted to ears 18 on the plate 14 and adapted to be turned on their pivots either down parallel with and close to the strips 13 when the leg is folded, as in Fig. 2, or to be extended above, as in Fig. 1, and upon the ends of the strips 17 are arranged lugs 19, which when the studs 11 on the brackets are engaged with the apertures 20 in the ends of said strips will prevent the removal of the legs from the head.

In practice I prefer to strike up the lugs 19 from the plate 21, which is secured to the end of the strips, and the ears 10 of the brackets 7 are provided with cut-away portions 22, so that the legs may be attached to the brackets by pressing the ends of said strips together, said strips being elastic, as usual, inserting them between the coöperating brackets while parallel or nearly so with the head 1, as shown in full lines, Fig. 4, and then turning said leg down to the position in dotted lines, when the lugs 19 will engage the outer sides of the brackets, as shown in dotted lines in said figure and as in full lines in Fig. 6, and prevent the disengagement of the parts. This construction is desirable in order that the tripod may be lifted bodily by grasping the upper end of the legs beneath the head without disengaging them from said head and without the necessity of employing a spreader, as heretofore.

Sliding between the strips 13 and the plates 15 and 16 is a leg-section 24, having a bifurcated lower end, to which is pivoted a leg-section 25, the latter being adapted to be folded up to the position shown in Fig. 2, so that the whole may slide between the strips 13, and to the lower end of this bifurcated section is attached a plate 26, with which coöperates a button 27 on the section 25 to hold the latter in position when extended, as in Fig. 1. One of the plates 15 is provided with a central aperture 28 and flange 29, having cam-surfaces, with which coöperates a cam-plate 30, having an operating-handle 31 extending through said aperture, and preferably with cam-surfaces 32, coöperating with the ones on the plate 15, said cam serving to lock the section 24 in any position to which it may be adjusted. When the leg is folded, as in Fig. 2, the ears 33 on the plates 15 and 16 will effectually prevent any lateral movement of the strips 13 and the cam-plate will hold the sliding parts securely in position, thus enabling the legs and head when folded, as in Fig. 4, to be packed flat for carrying.

The tripod just described is very simple, light, and folds in small compass for transportation, and when extended, as in Fig. 1, is very rigid and holds the camera securely.

It will be understood that instead of having the studs 11 on the brackets they could be arranged on the ends of the legs and perforations formed in the brackets.

The engaging lugs 19 could, of course, be used even when the brackets are rigid instead of pivoted.

I claim as my invention—

1. The combination with the tripod-head having the brackets pivoted thereon arranged in pairs folding toward each other parallel with the head and having the studs, of the legs composed of the strips having the apertures for engaging the studs, said strips being movable in the direction of the length of the studs, substantially as described.

2. The combination with the head, the pair of brackets pivoted thereon and movable toward and from each other, of the leg, and coöperating studs and recesses on the leg and brackets, extending at an angle to the plane of the pivots of the brackets, substantially as described.

3. The combination with the head and the pair of brackets thereon, of the leg, and the laterally-extending coöperating studs and recesses on the leg and brackets, and the coöperating lugs and recesses between the leg and brackets for preventing their relative movement in the direction of the studs, substantially as described.

4. The combination with the tripod-head, and the brackets thereon having the laterally-extending studs, of the leg composed of the strips with their engaging ends laterally movable provided with the recesses engaging the studs, and the lugs engaging the brackets and preventing the relative lateral movements of the leg and studs, substantially as described.

5. The combination with the head, the brackets thereon having the studs and the cut-away portions at the side, of the leg having the recesses for the studs, and the locking-lugs adapted to enter the cut-away portions and permit the engagement of the studs and recesses when the leg is turned in one direction and preventing the disengagement of the studs and recesses when turned in the other direction, substantially as described.

6. The combination with the head and a pair of brackets pivoted thereon having the ears 8 and the cut-away portion 22, of the leg having the lugs 19 thereon, and the engaging pins and recesses between the leg and brackets, substantially as described.

7. The combination with the head, the brackets 7 having the ears 8 and 10, and the studs 11, the pivots 9 and a leg having recesses for coöperating with the studs, substantially as described.

8. The tripod-head having the central screw-aperture, the recess 40 and the recesses 12, the screw having the reduced portion, and the slide adapted to be moved across the screw-aperture and the recess 40, of the brackets pivoted to the sides of the head having the ears 8 and 10 and studs 11 and the pivots 9, substantially as described.

9. The combination with the leg-section composed of the two strips 13, the plates 15 and 16 on opposite sides thereof, the former having the central apertures, and the cam-surfaces at the sides, of the leg-section 24 sliding between the strips and plates, and the rotary cam-plate 30 having the handle extending through the aperture, and the cam-surfaces coöperating with those on the plate 15, substantially as described.

10. The tripod-leg composed of the two strips 13 connected at their upper ends, the strips 17 pivoted to them and adapted to fold against their sides, of the plates 15 and 16, the former having the aperture and the cam-surfaces at the sides thereof, the leg-section 24 sliding between the strips 13, and the rotary cam-plate 30 having the cam-surfaces coöperating with those on the plate 15 and the handle extending through the aperture therein, substantially as described.

FRANK A. BROWNELL.

Witnesses:
FRED F. CHURCH,
G. A. RODA.